US005244067A

United States Patent [19]

Skotek et al.

[11] Patent Number: 5,244,067

[45] Date of Patent: Sep. 14, 1993

[54] WIRE RUNOUT AND SPLICE DETECTOR FOR LEAD-MAKING MACHINES

[75] Inventors: David A. Skotek, Harrisburg; George F. Bonifanti, Hummelstown, both of Pa.

[73] Assignee: The Whitaker Corporation, Wilmington, Del.

[21] Appl. No.: 994,221

[22] Filed: Dec. 21, 1992

[51] Int. Cl.[5] .......... F16D 71/00; B65H 66/00

[52] U.S. Cl. .......... 192/125 A; 192/125 F; 72/3; 72/5; 83/61; 226/11; 226/48

[58] Field of Search .......... 192/125 A, 125 F; 72/3, 72/4, 5; 83/61, 63, 66; 226/11, 45, 48

[56] References Cited

U.S. PATENT DOCUMENTS

| | | | |
|---|---|---|---|
| 2,101,382 | 12/1937 | Donovan et al. | 72/4 |
| 2,263,246 | 11/1941 | Morgan | 72/5 |
| 3,098,576 | 7/1963 | Steward | 192/125 A X |
| 3,152,740 | 10/1964 | Kindseth et al. | 226/11 |
| 3,429,491 | 2/1969 | Windley | 226/11 |
| 3,854,356 | 12/1974 | Okreglak | 83/66 |
| 4,206,666 | 6/1980 | Ashton | 192/125 A X |

*Primary Examiner*—Leslie A. Braun
*Assistant Examiner*—Andrea Pitts
*Attorney, Agent, or Firm*—Robert J. Kapalka

[57] ABSTRACT

A detector on a wire lead machine includes a pair of contacts biased into a normally closed position. The wire is fed between the contacts, keeping the contacts open, and the insulation on the wire prevents electrical conductivity between the contacts. If the wire runs out, the contacts close to shut off the machine. Additionally, a splice on the wire establishes an electrical path between the contacts and, again, the machine is shut off. The detector includes a detection circuit which generates a control signal. In the event a splice is passing through the contacts, the detection circuit generates a control signal having a relatively short time duration (as for example, 100 microseconds) and holds the signal for a sufficient time period (as for example, 500 milliseconds). This allows a suitable control means (which may include a microprocessor) to shut off the machine because of either wire runout or a splice on the wire, thereby preventing serious damage to the machine and maintaining productivity.

9 Claims, 6 Drawing Sheets

BEST AVAILABLE COPY
BEST AVAILABLE COPY

WIRE RUNOUT AND SPLICE DETECTOR FOR LEAD-MAKING MACHINES

FIELD OF THE INVENTION

The present invention relates to lead-making machines used in the electrical and electronic industries and, more particularly, to a detection means which will shut off the machine in the event of wire runout or a splice on the wire.

BACKGROUND OF THE INVENTION

Machines are available for producing leads used in various electrical or electronic products or equipment. These machines take insulated wire, strip off insulation from one or both ends thereof (the stripped off insulation being referred to in the art as a "slug"), crimp a terminal on to the exposed wire after stripping off the slug, and cut off the wire, thereby producing a finished lead with a terminal.

The wire runs through a typical machine at approximately 200 inches per second and at an acceleration of approximately 2,000 inches per second squared.

The reservoir of insulated wire running through the machine is contained in a barrel or reel. Typically, a barrel may be 36 inches in diameter, 40 inches high, and contain around 5 miles of wire. Because of this length, the barreled wire may include several splices; and at the high running speeds and relatively-small wire diameters, it is difficult if not impossible for the machine operator to visually detect a splice in time to shut off the machine. These splices interfere with the precision tooling within the machine and may cause severe damage thereto.

Moreover, the barreled wire may run out, or the wire may break, so that no wire is being fed into the machine while the machine is running. In the absence of wire, the cut-and-strip blades for producing the slugs will close on a terminal or a splice and damage the blades. A splice could also jam up a feed tube, damaging the tube.

As a result of wire runout or splices, the tooling is damaged, complete shutdown and replacement of the tooling is necessary, and valuable production is lost.

SUMMARY OF THE INVENTION

Accordingly, it is an object of the present invention to provide a wire runout and splice detector which will shut off the lead-making machine to avoid damage thereto.

In accordance with the teachings of the present invention, there is herein disclosed and claimed a preferred embodiment of a wire runout and splice detector for use in a machine for performing manufacturing operations on an insulated electrical wire, wherein the wire is passed continually through the machine, and wherein the lack of wire running through the machine, or a splice on the wire, could potentially damage the machine's tooling.

The wire runout and splice detector includes a pair of contacts which are resiliently biased into a closed position. Means are provided for passing the wire between the contacts in opposition to the resilient means. The wire keeps the contacts separated, and the insulation on the wire prevents electrical conductivity therebetween. However, the contacts will close when no wire is passing therebetween. Moreover, a splice on the wire will engage the respective contacts and complete an electrical path therebetween. A circuit means is provided, responsive to the closing of the contacts or to the relatively rapid completion of the electrical path between the contacts due to a splice therebetween, to generate a control signal and to hold the signal for a sufficient time period. A control means is responsive to the control signal to interrupt the machine operation, thereby preventing potential damage to the machine due to the lack of wire passing through the machine or otherwise due to a splice on the wire.

The circuit means holds the control signal for approximately 500 milliseconds. This allows the control means, which may be a microprocessor or a relay, sufficient time to react.

These and other objects of the present invention will become apparent from a reading of the following specification taken in conjunction with the enclosed drawings.

GENERAL DESCRIPTION OF THE PREFERRED EMBODIMENT

Figure 1:
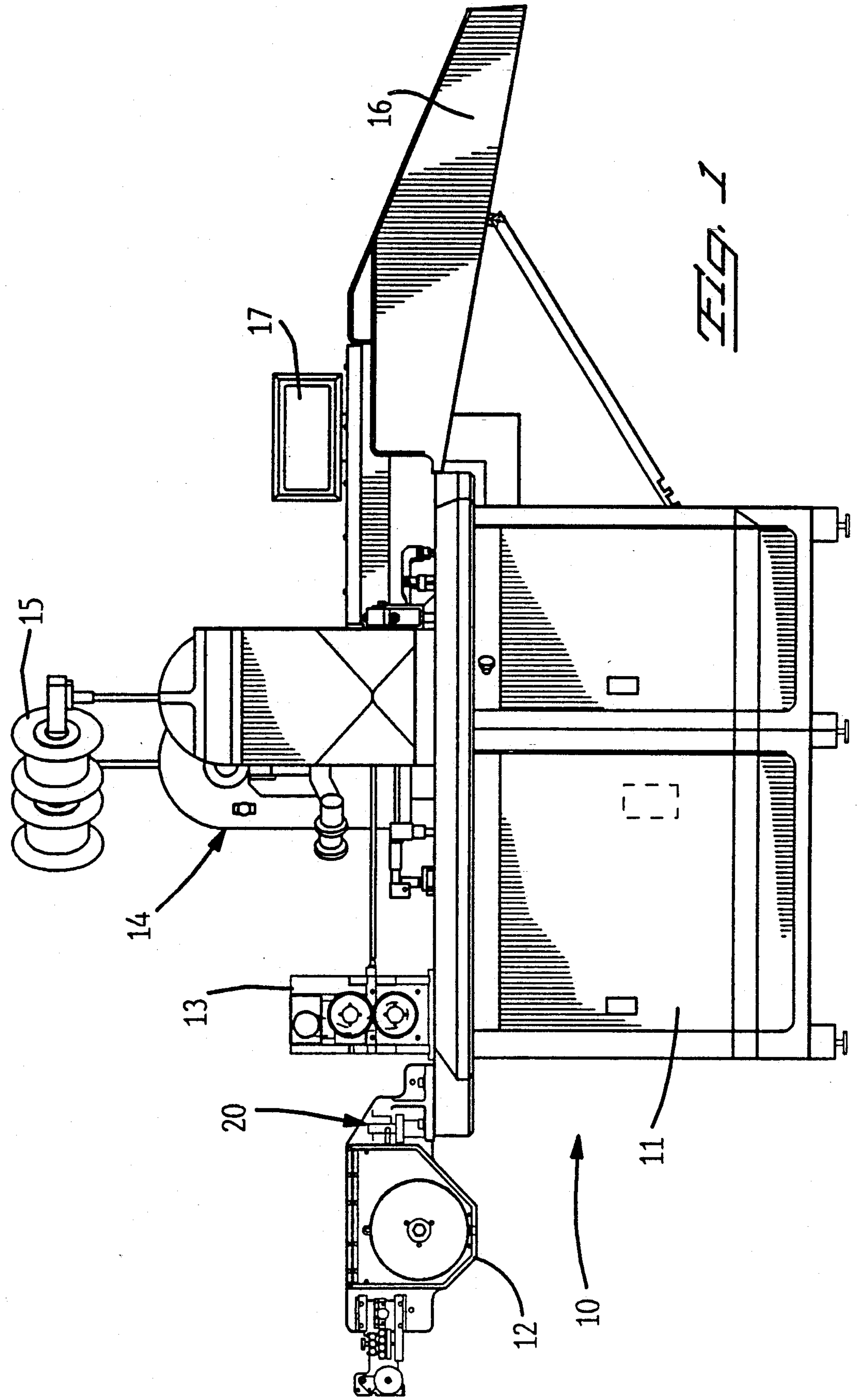
FIG. 1 is an elevational view of a conventional lead-making machine with which the teachings of the present invention has particular utility.

With reference to FIG. 1, there is shown a lead-making machine 10 with which the teachings of the present invention may find more particular utility. However, the invention is not confined thereto but, rather, is applicable to a wide variety of machines working on insulated wire.

With this in mind, the machine 10 generally comprises a frame or base 11, a wire pre-feed assembly 12, a wire feed assembly 13, two terminating units 14 including feed reels 15 for the terminals, a stacking tray 16 and a touch screen control 17.

Figure 2:
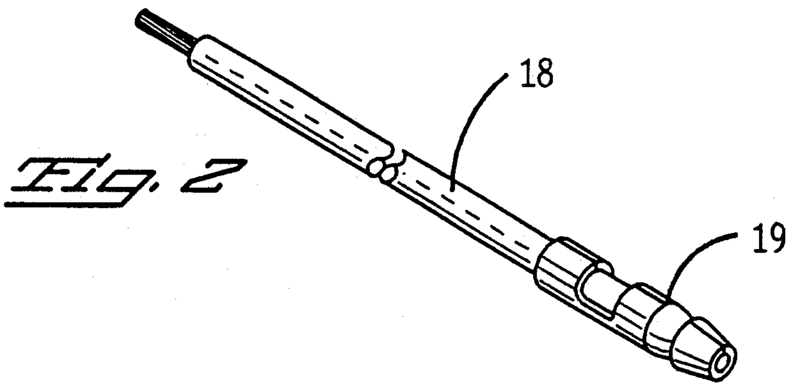
FIG. 2 is a perspective view of a typical wire lead produced by the machine shown in FIG. 1.
Figure 3:
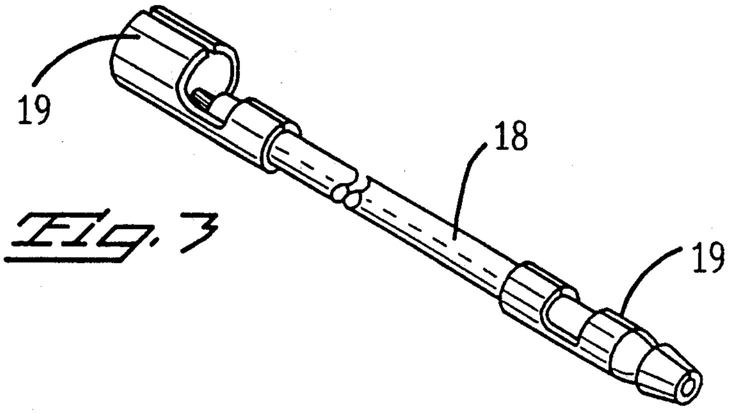
FIG. 3 is a perspective view of a further wire lead, corresponding to FIG. 2, but showing terminals crimped on both ends thereof.

With reference to FIGS. 2 and 3 (and by way of example only) the machine 10 produces wire leads 18 having suitable terminals 19 on one end thereof (FIG. 2) or, if desired, on both ends thereof (FIG. 3). The terminals 19 are barrel terminals; however, the machine 10 is capable of producing a wide variety of wire leads and terminals.

The machine 10, which is preferably supplied by AMP Incorporated of Harrisburg, Pennsylvania under its trademark "AMPOMATOR CLS III", combines high-speed wire processing with a flexibility to handle various production requirements.

More specifically, the "AMPOMATOR CLS III" machine 10 automatically dereels the wire from barrels or reels (not shown); accurately measures the wire electronically to ensure very precise and highly repeatable lead lengths; cuts the lead to length and strips the insulation to a preset dimension of 125 to 500 thousandths of an inch; terminates one end of the lead with a terminal; if desired, terminates the other end with the same or a different terminal; and, finally, stacks the finished leads. The leads 18 may be as short as 3 inches or as long as 1,000 inches, and the processing rates are up to 4,000 leads per hour. All of the leads are produced precisely and repeatedly.

Together with its productive power, the machine 10 is easy to use, thereby facilitating fast change over for producing different leads. The touch control screen 17 is the main operator control, allowing for convenient programming of up to 200 different lead assemblies, and the statistical data can be downloaded to a process control program.

Figure 6:
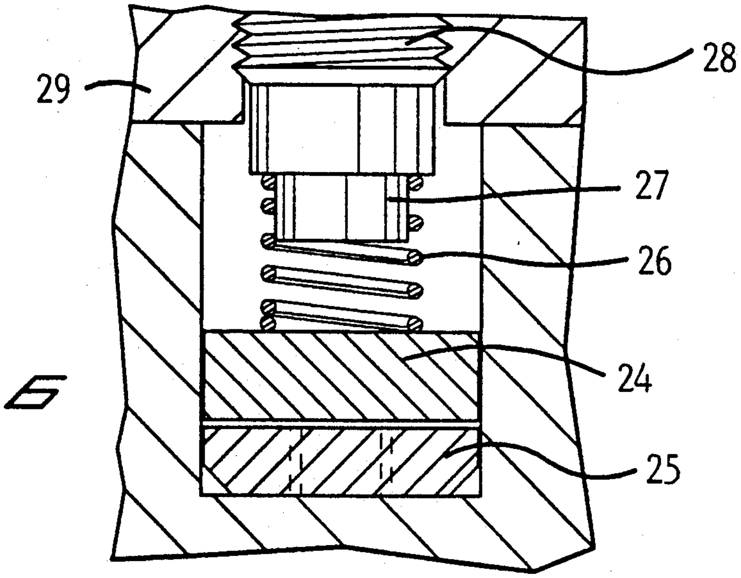
FIG. 6 is an enlarged portion of FIG. 5 showing the pair of spring-loaded contacts between which the wire passes.
Figure 5:
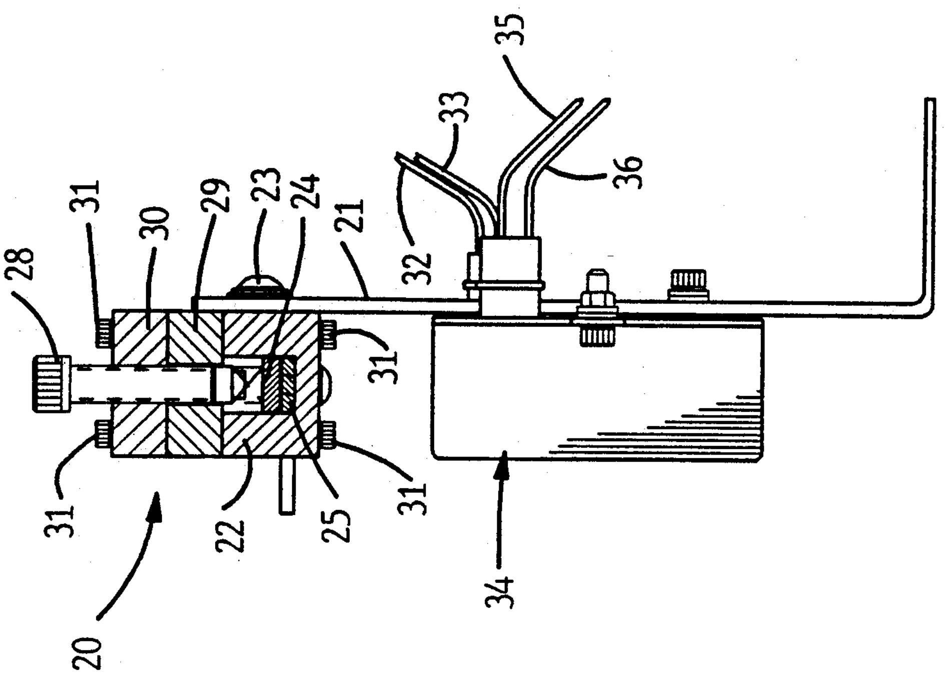
FIG. 5 is side elevational view thereof, partly in section and partly in elevation, taken along the lines 5—5 of FIG. 4.
Figure 4:
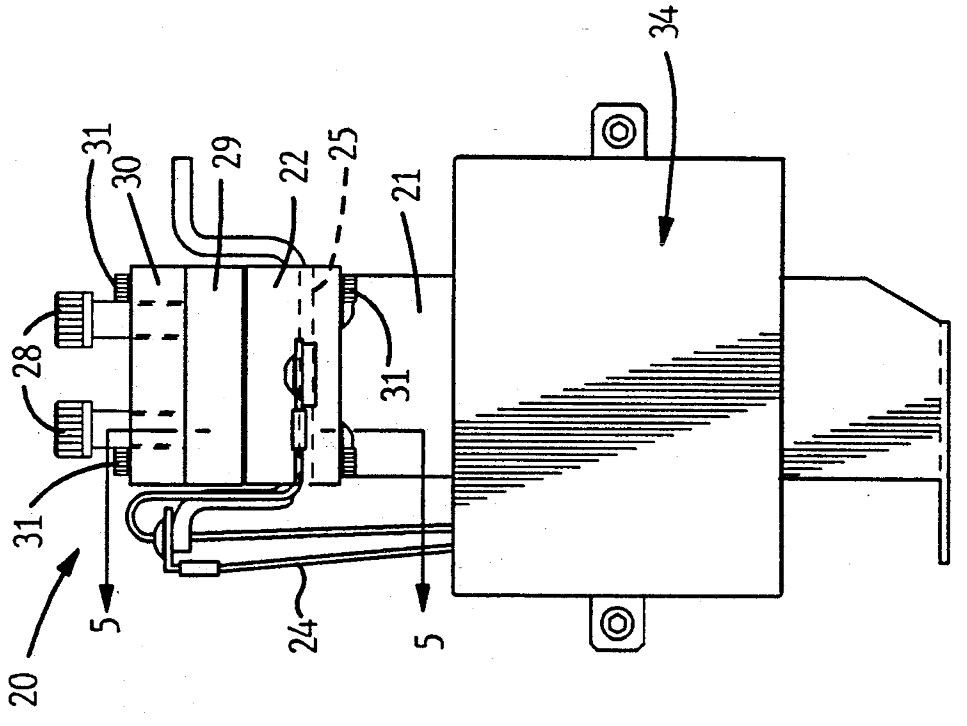
FIG. 4 is a portion of FIG. 1, drawn to an enlarged scale, and showing the detector of the present invention.

With reference again to FIG. 1 and with further reference to FIGS. 4–6, the machine 10 further includes the wire runout and splice detector 20 of the present invention.

The detector 20 is mounted on a bracket 21 on the machine 10 and is disposed along a wire feed path between the wire prefeed assembly 12 and the wire feed assembly 13 (as shown in FIG. 1). The detector 20 includes a housing 22 secured to the bracket 21 by a screw 23. Parallel contacts 24 and 25, within the housing 22, are biased together by a coil spring 26 or other suitable biasing means. The spring 26 is piloted on a turned-down stud 27 and held in place by screw 28. Means for adjusting the biasing force of the spring includes the set screw 28 which is threaded into an intermediate piece 29. As shown in FIGS. 4 and 5, preferably two set screws 28 are provided as well as two coil springs 26. A cap 30 is provided, and screws 31 (four at the top and four at the bottom) retain the overall assembly. The contacts 24, 25 carry leads 32 and 33, respectively, which input to a detection circuit 34 (or other suitable circuit means) having output leads 35 and 36.

Figure 7:
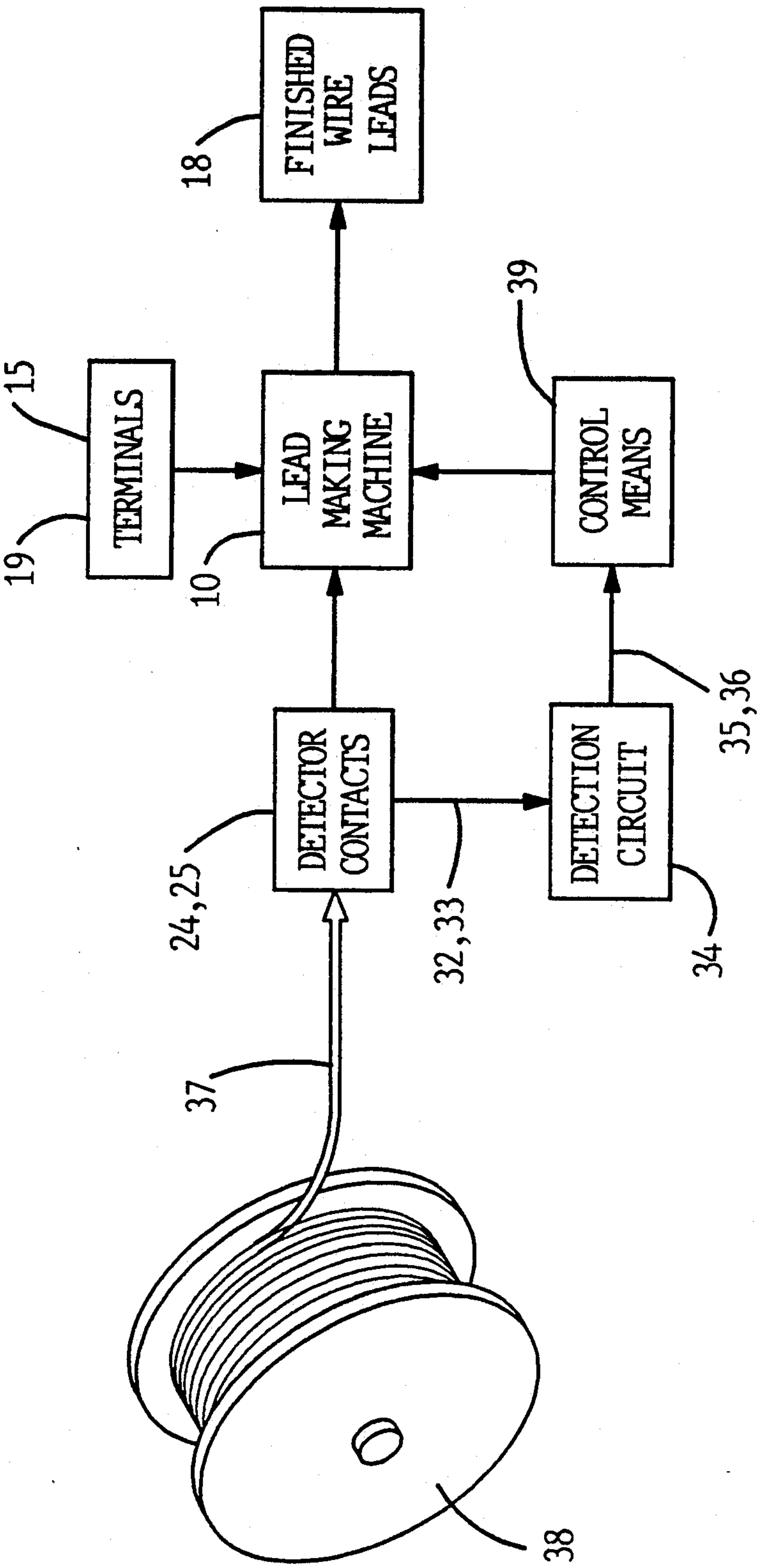
FIG. 7 is a block diagram showing how the detector contacts and the detection circuit function to control the lead-making machine.

With reference to FIG. 7, the wire 37 is fed from a reel 38 or barrel (not shown) through the detector 20 and into the machine 10; the machine 10 has the reels 15 of terminals to produce the finished wire leads 18. The contacts 24, 25 have respective leads 32, 33 (shown more clearly in FIG. 5) which feed into the detection circuit 34. The detection circuit 34, in turn, has leads 35, 36 feeding into a control means 39 for the machine 10. The control means 39 may include a microprocessor or relay (not shown) for shutting off the machine 10.

Figure 8:
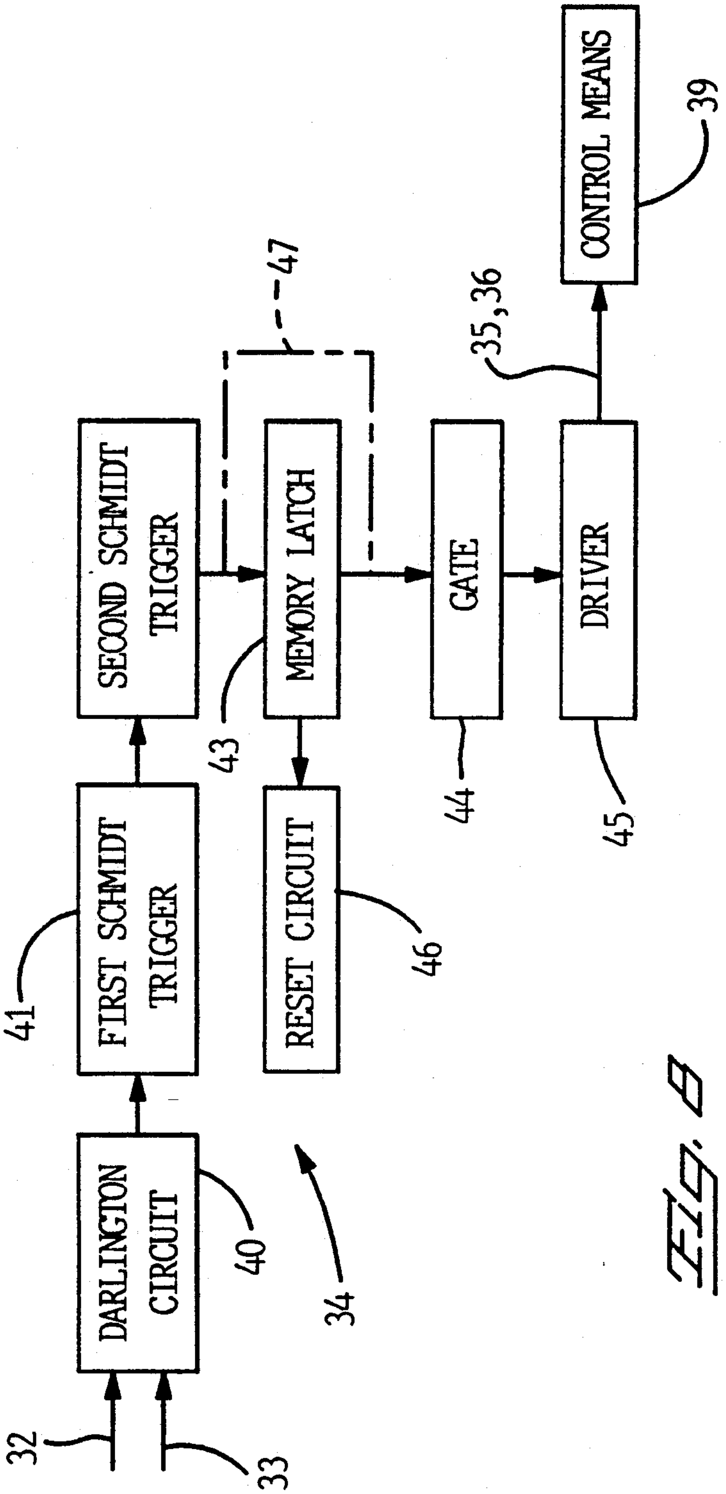
FIG. 8 is a schematic block diagram of the detection circuit of the present invention.

With reference to FIG. 8, the detection circuit 34 includes a transistorized Darlington circuit 40 connected to the leads 32, 33 from the respective contacts 24, 25. The purpose of the Darlington circuit 40 is to provide a buffer, alleviate static problems, and produce a control signal. A first Schmidt trigger 41 shapes the control signal, and a second Schmidt trigger 42 inverts the control signal. A memory latch 43 receives the shaped and inverted signal, and the output of the memory latch 43 is fed (via a gate 44) to a driver 45 to feed the control signal to the control means 39. A reset circuit, designated generally as 46 in FIG. 8, serves to reset the detection circuit 34. A short 47 is associated with the memory latch 43. The purpose of the short 47 is to bypass the memory latch 43 in the event the machine 10 is "powered up" while a splice is between the contacts 24, 25.

The detection circuit 34—which may be contained on a printed circuit or "PC" board (not shown herein)—generates a control signal having a relatively short time duration (as for example, approximately 100 microseconds) in the event a splice passes through the contacts 24, 25 at the relatively fast running speed of the wire through the machine 10. The detection circuit 34 then holds the control signal for a relatively long time duration (as for example, approximately 500 milliseconds). This allows the microprocessor or relay (not shown) in the control means 39 a sufficient time to react.

Figure 9:
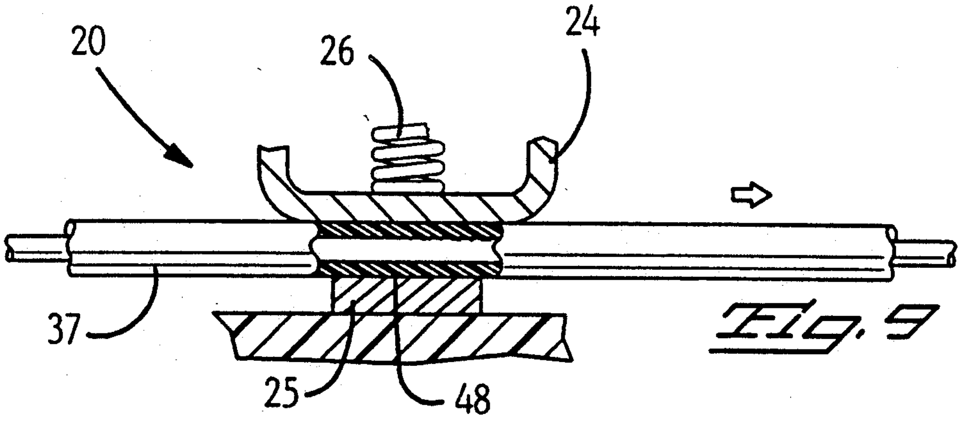
FIGS. 9, 10 and 11 are schematic views showing the operation of the invention; wherein the insulated wire passes between the contacts to maintain the contacts in an open position while the machine is running (FIG. 9); wherein the contacts close because of wire runout to shut off the machine (FIG. 10); and wherein a splice on the wire completes an electrical path between the contacts to shut off the machine (FIG. 11).
Figure 10:
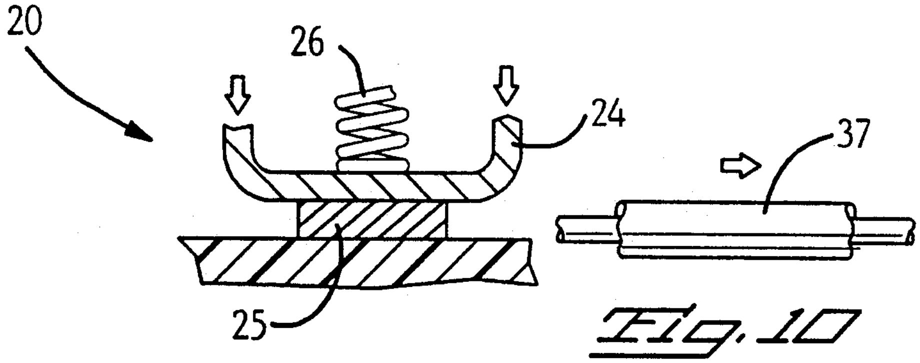
Figure 11:
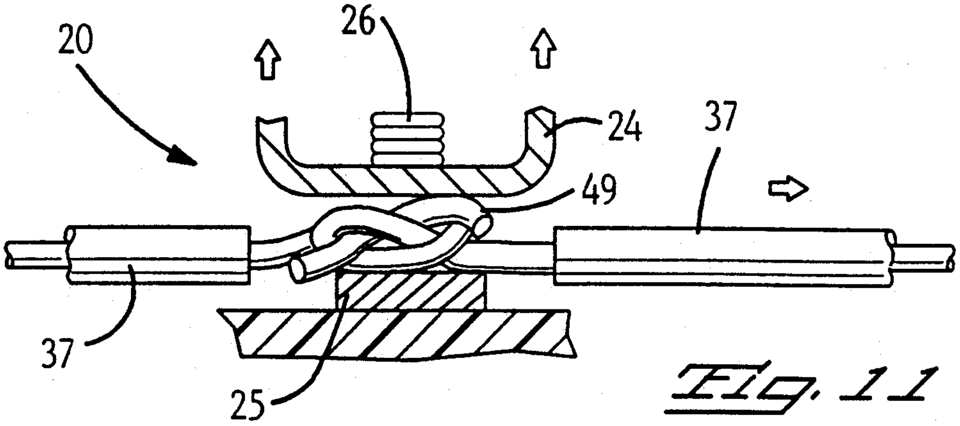

With reference to FIGS. 9, 10 and 11, the utility and advantages of the present invention will be readily appreciated. In FIG. 9, the wire 37 is passing between the contacts 24 and 25, separating the contacts 24 and 25, and the insulation 48 on the wire 37 prevents an electrical path between the contacts 24 and 25. However, if the wire runs out, as shown in FIG. 10, the contacts 24 and 25 close to shut off the machine 10. Moreover, a splice 49 on the wire 37 will establish an electrical path between the contacts 24 and 25, again shutting off the machine 10.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In a machine for performing manufacturing operations on an insulated electrical wire, wherein the wire is passed continually through the machine, a wire runout and splice detector for detecting one of a lack of wire running through the machine and a splice on the wire, the detector comprising:

a pair of electrically conductive contacts disposed on opposite sides of a wire feed path;

means for biasing the contacts into a closed position;

means for passing the wire along the wire feed path between the contacts in opposition to the means for biasing, such that the wire keeps the contacts separated and insulation on the wire prevents electrical conductivity between the contacts; such that the contacts will close when no wire is disposed therebetween, and such that a splice on the wire will engage between the contacts and complete an electrical path therebetween;

circuit means responsive to one of the closing of the contacts and the completion of the electrical path between the contacts due to a splice therebetween to generate a control signal; and, control means responsive to the control signal to interrupt operation of the machine.

2. The wire runout and splice detector of claim 1, wherein the pair of contacts comprises a pair of contact strips disposed parallel to each other.

3. The wire runout and splice detector of claim 1, further comprising means for adjusting a biasing force produced by the means for biasing.

4. The wire runout and splice detector of claim 3, wherein the means for adjusting the biasing force comprises a spring backed by a set screw.

5. The wire runout and splice detector of claim 1, wherein the circuit means generates a control signal of approximately 100 microseconds.

6. The wire runout and splice detector of claim 1, wherein the circuit means holds the control signal for approximately 500 milliseconds, thereby allowing the control means sufficient time to react.

7. The wire runout and splice detector of claim 1, wherein the circuit means comprises:

a Darlington circuit connected to the pair of contacts, thereby providing a buffer, alleviating static problems, and producing the control signal;

means for shaping and inverting the signal;

a memory latch to receive the shaped and inverted signal;

gating means connected to an output of the memory latch;

driving means to feed the signal to the control means; and, re-set means enabling the circuit means to recycle its operation.

8. The wire runout and splice detector of claim 7, wherein a shorting means is associated with the memory latch; such that if the machine is powered up while a splice on the wire is between the contacts, the machine cannot be turned "on".

9. The wire runout and splice detector of claim 1, wherein the control signal has a relatively short time duration and the circuit means holds the control signal for a relatively longer time duration.

* * * * *